United States Patent
Kamamoto

(10) Patent No.: US 11,250,405 B2
(45) Date of Patent: Feb. 15, 2022

(54) COMMODITY SALES DATA PROCESSING APPARATUS WITH MULTIPLE TAG READERS

(71) Applicant: TOSHIBA TEC KABUSHIKI KAISHA, Tokyo (JP)

(72) Inventor: Shunichiro Kamamoto, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/932,144

(22) Filed: Jul. 17, 2020

(65) Prior Publication Data
US 2021/0090058 A1    Mar. 25, 2021

(30) Foreign Application Priority Data

Sep. 24, 2019  (JP) .............................. JP2019-173500

(51) Int. Cl.
  *G06Q 20/20*   (2012.01)
  *G06K 7/10*    (2006.01)
  *G07G 1/00*    (2006.01)
  *H01Q 1/22*    (2006.01)

(52) U.S. Cl.
  CPC ........ *G06Q 20/208* (2013.01); *G06K 7/10128* (2013.01); *G06K 7/10356* (2013.01); *G06K 7/10425* (2013.01); *G06Q 20/204* (2013.01); *G07G 1/009* (2013.01); *H01Q 1/2216* (2013.01)

(58) Field of Classification Search
  CPC .............................. G06Q 20/208; G07G 1/009
  USPC ......................................................... 235/383
  See application file for complete search history.

(56) References Cited

U.S. PATENT DOCUMENTS

| | | | |
|---|---|---|---|
| 2006/0192003 A1 | 8/2006 | Chung | |
| 2006/0261161 A1* | 11/2006 | Murofushi | G06Q 30/06 235/383 |
| 2009/0027205 A1 | 1/2009 | Suzuki | |
| 2010/0212565 A1* | 8/2010 | Clayman | A41H 42/00 112/475.09 |
| 2017/0372562 A1* | 12/2017 | Terahara | G07G 1/0072 |
| 2018/0053171 A1* | 2/2018 | Suzuki | G06K 7/10089 |

(Continued)

FOREIGN PATENT DOCUMENTS

JP    2009289276 A    12/2009

OTHER PUBLICATIONS

Extended European Search Report dated Feb. 15, 2021, mailed in counterpart European Application No. 20192483.4, 7 pages.

*Primary Examiner* — Suezu Ellis
(74) *Attorney, Agent, or Firm* — Kim & Stewart LLP

(57) ABSTRACT

A commodity sales data processing apparatus includes a registration unit a first antenna positioned to read information from a wireless tag in a first region in which an article is to be placed for registration in a sales transaction. A first tag reader sends article information read from the wireless tag in the first region to the registration unit. A second antenna is positioned to read information from the wireless tag a second region. A second tag reader is connected to second antenna and configured to send article information read from the wireless tag to the registration unit to register the article in the sale transaction, if not already registered, and transmit a sale finished command to the wireless tag when the article has already been registered in the transaction.

20 Claims, 6 Drawing Sheets

(56) References Cited

U.S. PATENT DOCUMENTS

2019/0138772 A1    5/2019   Sakurai
2021/0081919 A1*   3/2021   Sakurai ................ G06Q 20/208

* cited by examiner

COMMODITY SALES DATA PROCESSING APPARATUS WITH MULTIPLE TAG READERS

CROSS-REFERENCE TO RELATED APPLICATION

This application is based upon and claims the benefit of priority from Japanese Patent Application No. 2019-173500, filed Sep. 24, 2019, the entire contents of which are incorporated herein by reference.

FIELD

Embodiments described herein relate generally to a commodity sales data processing apparatus.

BACKGROUND

There is a commodity sales data processing apparatus, such as a POS (Point of Sales) terminal, having a function of collectively reading, with a wireless tag reader, tag information being transmitted by multiple wireless tags attached to different commodities being purchased in a sales transaction and then executing commodity registration processing for the sales transaction.

After the execution of the commodity registration processing, information indicating that the commodity has been sold (purchased) is written into the wireless tags of the commodities in the transaction by a sales finishing command.

However, if the wireless tags are being collectively read, the time required for the collective reading increases if the information indicating that each commodity has been sold must be written in the wireless tags as part of the transaction.

DETAILED DESCRIPTION

An object of embodiments is to provide a commodity sales data processing apparatus that can write information in wireless tags indicating that a commodity has been sold but reducing the time required for collectively reading wireless tags.

In general, according to an embodiment, a commodity sales data processing apparatus includes a registration unit configured to register articles to be purchased in a sales transaction. A first region is provided in which an article to be purchased is initially placed. A first antenna is positioned to read information from a wireless tag on the article when the article is placed in the first region. A first tag reader is connected to the first antenna and configured to send article information read from the wireless tag to the registration unit to register the article in the sales transaction. A second region is provided in which the article to be purchased is to be placed after being removed from the first region. A second antenna is positioned to read information from the wireless tag on the article when the article is in the second region. A second tag reader is connected to second antenna and configured to send article information read from the wireless tag to the registration unit to register the article in the sale transaction, if not already registered, and transmit a sale finished command to the wireless tag when the article has already been registered.

A commodity sales data processing apparatus according to a non-limiting example embodiment is explained with reference to the drawings. The commodity sales data processing apparatus explained in this embodiment is a system with which a customer performs settlement for purchased commodities by himself or herself. Such a system/apparatus may be referred to as a self-checkout system/apparatus.

Commodity Information Reading Devices

Figure 1:
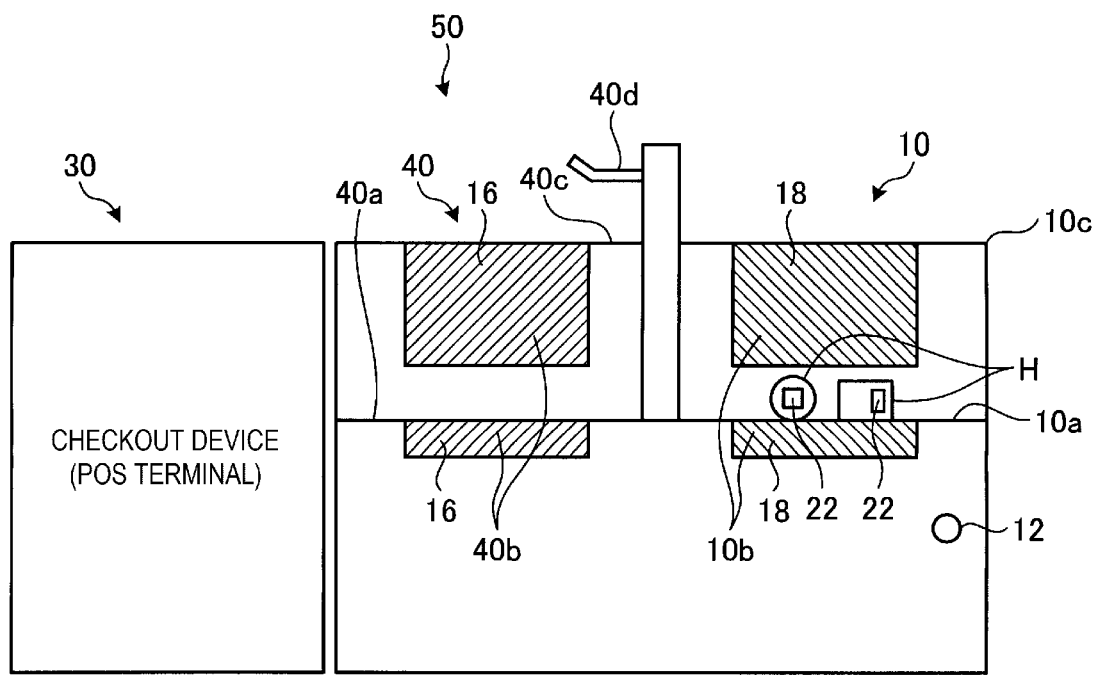
FIG. 1 is an exterior view illustrating an example of a commodity sales data processing apparatus according to an embodiment.

FIG. 1 is an exterior view illustrating one example of a commodity sales data processing apparatus 50 according to an embodiment.

As illustrated in FIG. 1, the commodity sales data processing apparatus 50 includes a commodity information reading device 10, a commodity information reading device 40, and a checkout device 30, which is a POS (Point of Sales) terminal. These components are arranged in the stated order from right-to-left in the diagram.

The commodity information reading device 10 performs reading processing for reading a commodity code of a commodity being purchased by a customer and commodity registration processing for registering the commodity as read by the reading processing.

The commodity information reading device 40 performs processing (reading processing) for reading a commodity code of a commodity being purchased by a customer, commodity registration processing for registering the commodity as read by the reading processing, and erasing processing for erasing an RFID tag attached to the commodity.

The checkout device 30 performs commodity sales data processing including a payment process for the commodities registered by the commodity registration processing.

The commodity sales data processing apparatus 50 in this example includes two commodity information reading devices, that is, more particularly, the commodity information reading device 10 and the commodity information reading device 40. However, in other examples, the commodity sales data processing apparatus 50 may include just one commodity information reading device. In such a case, the commodity information reading device only has to control a flat antenna 18 set on a commodity placing table 10a, a sacker table 40a, and a flat antenna 16.

Commodity Information Reading Device 10

The commodity information reading device 10 includes the commodity placing table 10a and a reading unit 10b.

The commodity placing table 10a is a table or counter region on which commodities H, which are articles being purchased by a customer, or a shopping basket storing the commodities H is temporarily placed during the initial stage of the commodity registration process. RFID (Radio Frequency Identification) tags 22 are attached to the commodities H. The RFID tags 22 are an example of a wireless tag. The RFID tags 22 store tag information. The tag information is, for example, commodity codes capable of identifying the commodities H. The commodity placing table 10*a* is a first region where the commodities H attached with the RFID tags 22 are initially placed.

The commodity placing table 10*a* includes a human sensor 12. The human sensor 12 is, for example, an infrared sensor and detects the approach of the customer. If the human sensor 12 detects the approach of the customer, the reading unit 10*b* starts.

The reading unit 10*b* performs reading processing for collectively reading, from the RFID tags 22, the commodity codes of the commodities H placed on the commodity placing table 10*a*. That is, the reading unit 10*b* receives the commodity codes of the RFID tags 22 of the commodities H placed on the commodity placing table 10*a*.

The reading unit 10*b* includes at least two flat antennas 18 respectively on the commodity placing table 10*a* and a member 10*c* erected in the vertical direction with respect to the commodity placing table 10*a*. That is, the reading unit 10*b* includes a plurality of flat antennas 18 having different radio wave radiating directions. The flat antennas 18 communicate with the RFID tags 22 attached to the commodities H. A wireless tag reader 19 (see FIG. 3) reads the tag information from the RFID tags 22 superimposed on a received radio wave.

Commodity Information Reading Device 40

The commodity information reading device 40 includes the sacker table 40*a* and a reading unit 40*b*. Like the reading unit 10*b*, the reading unit 40*b* starts if the human sensor 12 detects approach of the customer.

The sacker table 40*a* is a table or counter region to be used for bagging the commodities H were subjected to the commodity registration processing by the commodity information reading device 10. The customer performs, at the sacker table 40*a*, bagging of the commodities H that have been subjected to the commodity registration processing by the commodity information reading device 10. That is, the sacker table 40*a* is a second region where the commodities H are shifted after the commodity placing table 10*a*.

The sacker table 40*a* includes a bag hook 40*d* for hanging and holding a shopping bag in which the purchased commodities H can be put. That is, the bag hook 40*d* is a holding member that holds a bag for receiving the commodities H therein.

The customer bags the commodities H in the shopping bag hung on the bag hook 40*d*. Thereafter, the customer performs payment (transaction settlement) at the checkout device 30.

When the customer is bagging the commodities H, the reading unit 40*b* performs reading processing for individually reading, from the RFID tags 22, commodity codes of each of the commodities H placed on the sacker table 40*a*. Reading accuracy of a collective reading of multiple RFID tags 22 is not always 100% in this reading processing. Therefore, after the collective reading is performed, reading is also performed at the stage of the bagging as well, and payment amount is decided only once the bagging is completed.

In addition, when the customer is bagging the commodities H, the reading unit 40*b* writes, in the RFID tags 22 attached to the commodities H subjected to the commodity registration processing in the commodity information reading device 10 or the commodity information reading device 40 and placed on the sacker table 40*a*, information indicating that the commodities H have been sold.

The reading unit 40*b* includes at least two flat antennas 16 respectively in the sacker table 40*a* and a member 40*c* erected in the vertical direction with respect to the sacker table 40*a*. That is, the reading unit 40*b* includes a plurality of flat antennas 16 having different radio wave radiating directions. The flat antennas 16 communicate with the RFID tags 22 attached to the commodities H. A wireless tag reader 17 (see FIG. 3) reads the tag information from the RFID tags 22 superimposed on a received radio wave.

The wireless tag reader 17 transmits a sales finishing command to the RFID tags 22 based on which tag information has been read and writes, in the RFID tags 22, information indicating that the commodities H are sold. This prevent a situation in which the commodity codes stored in the RFID tags 22 already subjected to the commodity registration processing are read again by the wireless tag reader 17 such that the commodities H might be redundantly registered for sale or a crime prevention gate erroneously activates on the basis of detection of the RFID tags 22 of already purchased products. That is, the reading unit 40*b* is a second device that transmits information indicating that the commodities H placed on the sacker table 40*a* have been sold.

Checkout Device 30

Figure 2:
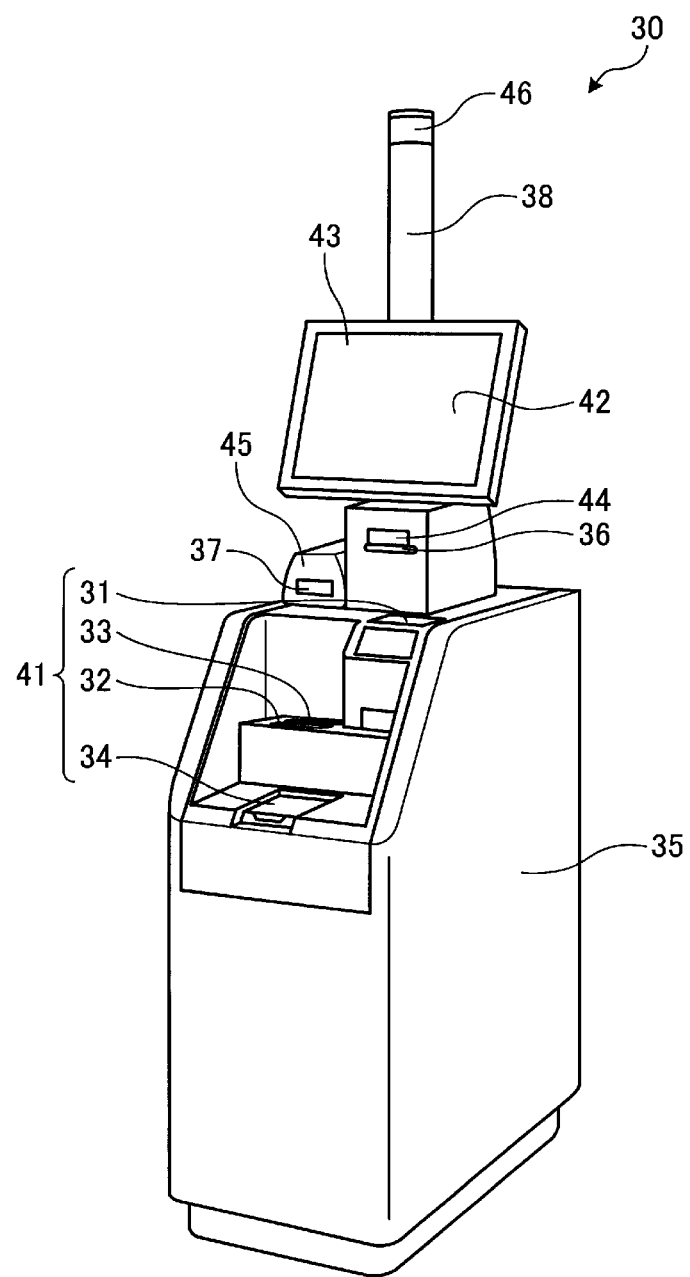
FIG. 2 is an exterior perspective view of a checkout device.

The configuration of the checkout device is explained with reference to FIG. 2. FIG. 2 is an exterior perspective view of the checkout device 30. The checkout device 30 includes, above a housing 35, a currency depositing and dispensing device 41, a monitor 42, a touch panel 43, a receipt printer 44, a card reader 45, and a light emitting unit 46.

The currency depositing and dispensing device 41 includes a coin depositing port 31, a bill depositing port 32, a bill dispensing port 33, and a coin dispensing port 34. The currency depositing and dispensing device 41 stores bills deposited to the bill depositing port 32 in a bill storing unit. The currency depositing and dispensing device 41 stores coins deposited to the coin depositing port 31 in a coin storing unit. The currency depositing and dispensing device 41 dispenses bills to the bill dispensing port 33 in response to a dispensing request for bills from a control unit 300 (see FIG. 4). The currency depositing and dispensing device 41 dispenses coins to the coin dispensing port 34 in response to a dispensing request for coin from the control unit 300.

The monitor 42 includes the touch panel 43 on the surface thereof. The monitor 42 is configured by, for example, a liquid crystal panel. The monitor 42 displays, with an image or text characters, information relating to a payment process such as a total amount of a transaction. The touch panel 43 outputs information corresponding to a touched position to the control unit 300.

The receipt printer 44 includes a printing unit and a receipt dispensing port 36. The receipt printer 44 dispenses a receipt printed by the printing unit from the receipt dispensing port 36.

The card reader 45 reads information from and possibly writes information to a credit card or a member card inserted from a card insertion port 37.

The light emitting unit 46 is set at the upper end of a display pole 38 and emits light if, for example, an abnormality occurs in the operation of the checkout device 30. The light emitting unit 46 includes, for example, an LED that emits light in blue and an LED that emits light in red. The light emitting unit 46 may include an LED that emits light in a color different from blue and red or may include other light emitting members. Since the light emitting unit 46 is provided at the upper end of the display pole 38, a store clerk present near the checkout device 30 can easily view the light emitting unit 46.

The customer operates the checkout device 30 to perform processing for paying a price for the commodities H with cash, a credit card, electronic money, or the like. This can be referred to as a payment process or a transaction settlement process. In the payment process, the checkout device 30 displays, based on commodity registration information received from the commodity information reading device 10, a total amount of the transaction and controls processing relating to payment of the total amount. The commodity registration information includes information such as a total amount of the transaction set as a processing target and commodity codes of the transaction commodities. The commodity registration information may include other information necessary for receipt printing, for example, sales promotion information for receipt printing.

Hardware Configuration of a Commodity Information Reading Device

Figure 3:
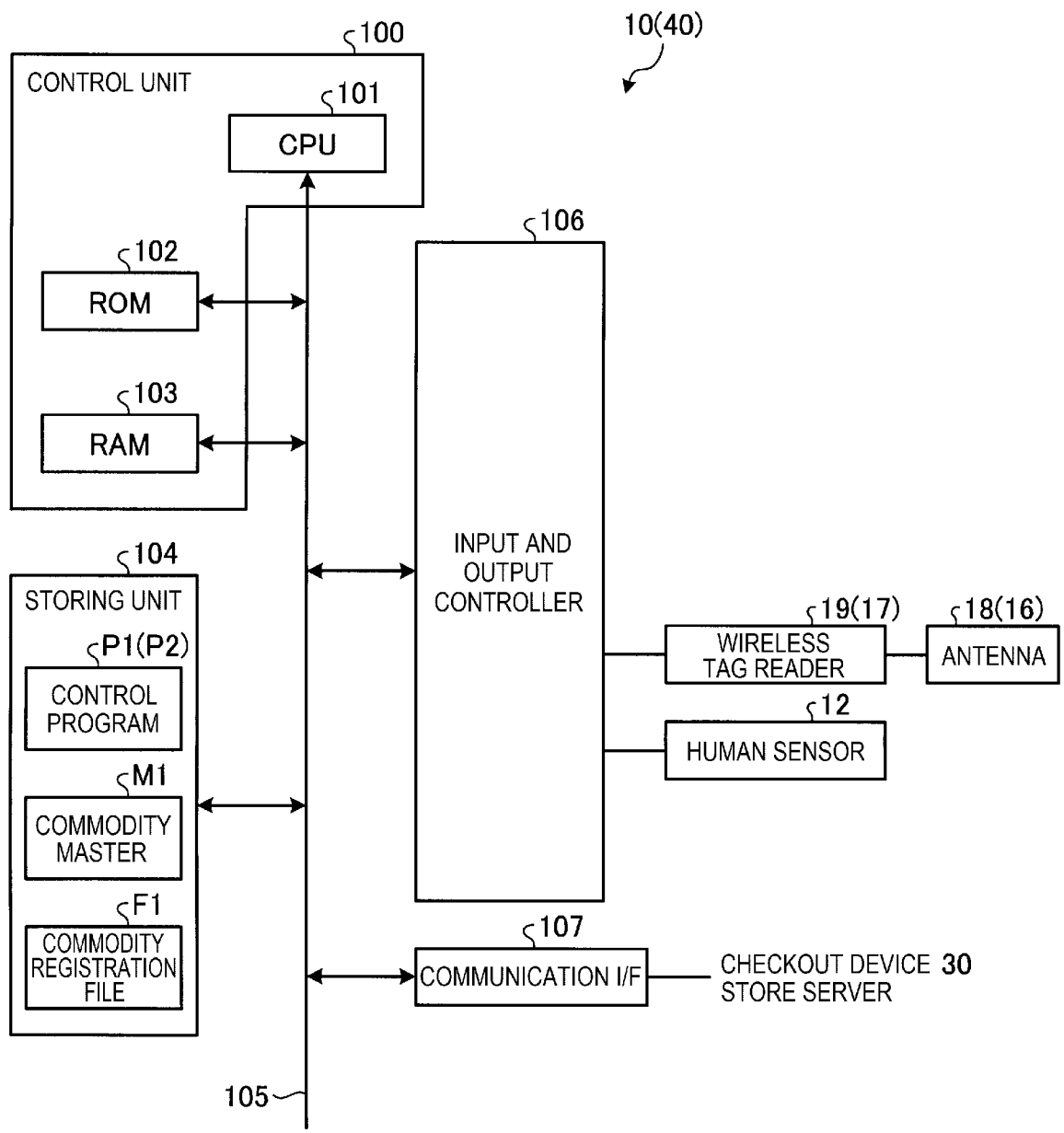
FIG. 3 is a block diagram illustrating aspects of a hardware configuration of a commodity information reading device.

A hardware configuration of the commodity information reading device 10 (and similarly the commodity in formation reading device 40) is explained with reference to FIG. 3. FIG. 3 is a block diagram illustrating an example of the hardware configuration of the commodity information reading device 10 (40). In FIG. 3, components common to the commodity information reading device 10 and the commodity information reading device 40 are denoted by the same reference numerals and signs. Portions different in some manner between the commodity information reading device 10 and the commodity information reading device 40 are denoted with different reference numerals and signs.

A control unit 100 includes a CPU (Central Processing Unit) 101, a ROM (Read Only Memory) 102, and a RAM (Random Access Memory) 103. The CPU 101 is connected to the ROM 102 and the RAM 103 via a bus line 105. The CPU 101 loads, in the RAM 103, a control program P1 (P2) stored in the ROM 102 or a storing unit 104. The CPU 101 operates according to the control program P1 (P2) loaded in the RAM 103 to control the operation of the commodity information reading device 10. That is, the control unit 100 has the configuration of a general-purpose computer and various functions are realized by execution of software instructions.

The control unit 100 is further connected to the storing unit 104, an input and output controller 106, and a communication I/F (Interface) 107 via the bus line 105.

The storing unit 104 is a nonvolatile memory such as a flash memory, in which stored information is retained even if a power supply is turned off, a HDD (Hard Disk Drive), or the like. The storing unit 104 stores programs and the like including the control program P1 (P2). The control program P1 is a program for exerting the functions included in the commodity information reading device 10. The control program P2 is a program for exerting the functions included in the commodity information reading device 40. The control program P2 is different from the control program P1 in that the control program P2 controls the wireless tag reader 17 (see FIG. 3) to transmit a sales finishing command for writing, in the RFID tags 22, information indicating that the commodities H are sold.

Note that the control program P1 (P2) may be incorporated in the ROM 102 in advance. The control program P1 (P2) may also or instead be recorded in a non-transitory computer-readable recording medium such as a CD-ROM, a flexible disk (FD), a CD-R, or a DVD (Digital Versatile Disc) as a file of a format installable in the control unit 100 or a format executable by the control unit 100.

Further, the control program P1 (P2) may be stored on a computer connected to a network such as the Internet and may be downloaded through the network. The control program P1 (P2) may distributed through a network such as the Internet.

The storing unit 104 stores a commodity master M1 and a commodity registration file F1. The commodity master M1 is a master file that stores commodity information of all the commodities H sold in a store. The commodity information includes commodity codes capable of identifying the commodities H, commodity names, prices, and the like. Since the commodities H sold in the store may change everyday, the commodity information reading device 10 (40) acquires the latest commodity master M1 from a store server via the communication I/F 107.

The commodity registration file F1 is a file that stores commodity codes of the commodities H purchased by the customer as acquired from the commodity master M1.

The input and output (I/O) controller 106 connects the wireless tag reader 19 (17) and the human sensor 12 illustrated in FIG. 3. The input and output controller 106 controls the operation of the various kinds of hardware connected thereto based on a command from the control unit 100.

The communication I/F 107 performs communication with the checkout device 30 and the store server.

Hardware Configuration of Checkout Device 30

Figure 4:
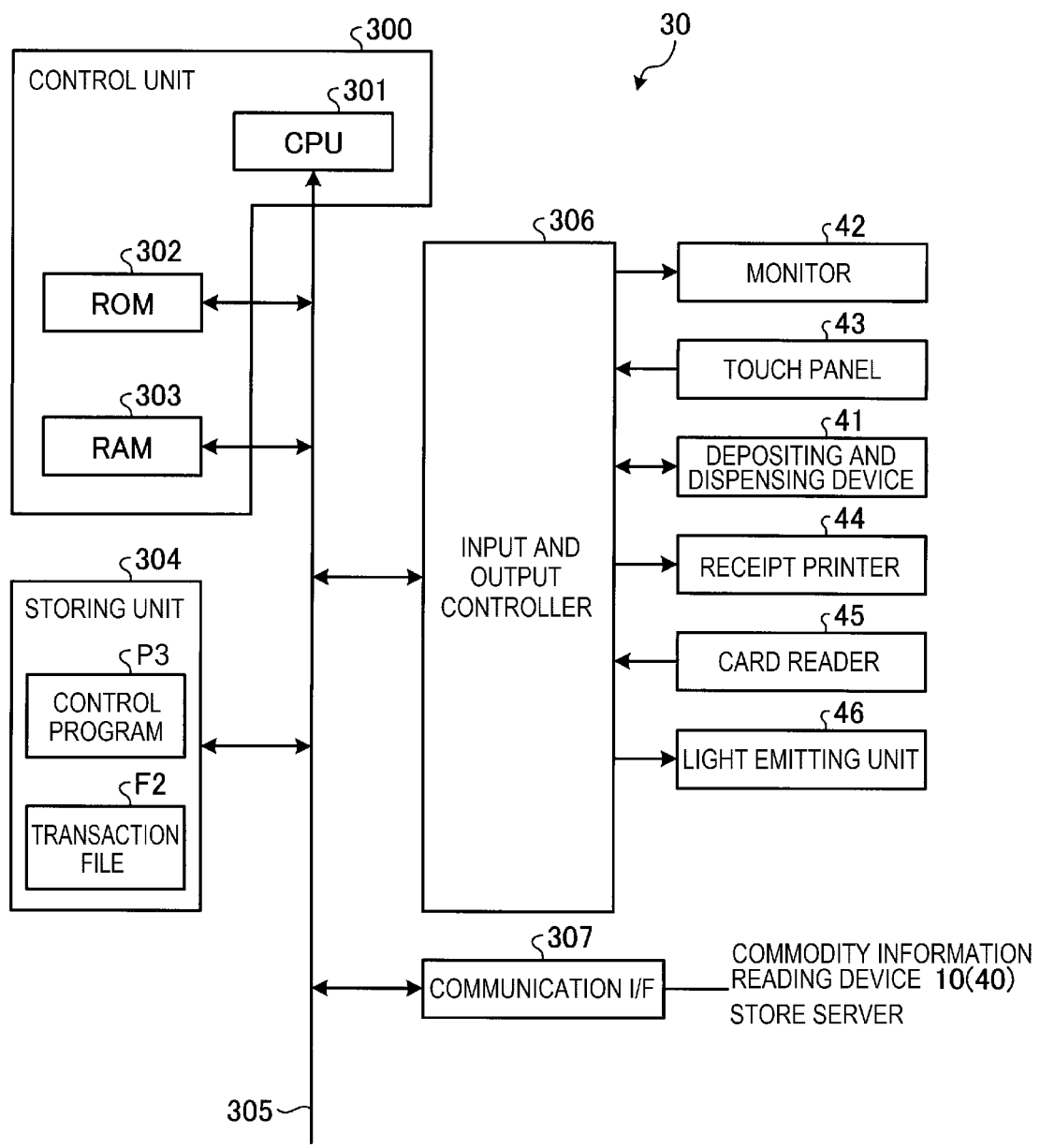
FIG. 4 is a block diagram illustrating aspects of a hardware configuration of a checkout device.

A hardware configuration of the checkout device 30 is explained with reference to FIG. 4. FIG. 4 is a block diagram illustrating an example of the hardware configuration of the checkout device 30. The checkout device 30 includes a control unit 300, a storing unit 304, an input and output (I/O) controller 306, and a communication I/F 307.

The control unit 300 includes a CPU 301, a ROM 302, a RAM 303. The CPU 301 is connected to the ROM 302 and the RAM 303 via a bus line 305. The CPU 301 loads, in the RAM 303, the control program P3 stored in the ROM 302 or the storing unit 304. The CPU 301 operates according to the control program P3 loaded in the RAM 303 to control the operation of the checkout device 30. That is, the control unit 300 has the configuration of a general-purpose computer that realizes various functions by execution of program instructions.

The control unit 300 is further connected to the storing unit 304, the input and output controller 306, and the communication I/F 307 via the bus line 305.

The storing unit 304 is a nonvolatile memory such as a flash memory, in which stored information is retained even if a power supply is turned off, an HDD, or the like. The storing unit 304 stores programs and the like including the control program P2. The control program P2 is a program for exerting the functions included in the checkout device 30.

The control program P3 may be incorporated in the ROM 302 in advance. The control program P2 may be recorded in a computer-readable recording medium such as a CD-ROM, a flexible disk (FD), a CD-R, or a DVD as a file of a format installable in the control unit 300 or a format executable by the control unit 300. Further, the control program P3 may be stored on a computer connected to a network such as the Internet and downloaded through the network. The control program P3 may be provided or distributed through the network such as the Internet.

The storing unit 304 stores a transaction file F2. The transaction file F2 is a data file that stores content of the commodity registration file F1 received from the commodity information reading device 10, payment data recording a result of the payment process executed by the checkout device 30, and the like. The transaction file F2 is used as data recording a transaction history.

The input and output controller 306 is connected to the monitor 42, the touch panel 43, the depositing and dispensing device 41, the receipt printer 44, the card reader 45, and the light emitting unit 46 illustrated in FIG. 4. The input and output controller 306 controls the operation of the various kinds of hardware connected thereto based on a command from the control unit 300.

The communication I/F 307 communicates with the commodity information reading device 10 and the store server.

Functional Aspects of a Commodity Information Reading Device

Figure 5:
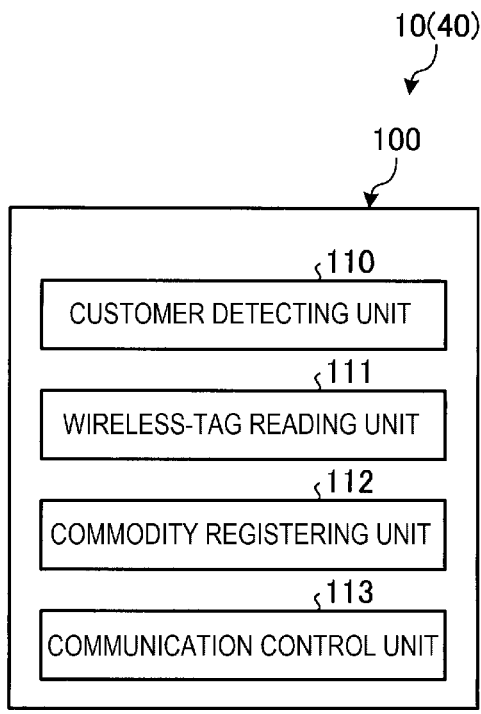
FIG. 5 is a block diagram illustrating aspects of a functional configuration of a commodity information reading device.

Functional aspects of a commodity information reading device 10 (40) are explained with reference to FIG. 5. FIG. 5 is a block diagram illustrating an example of the functional configuration of the commodity information reading device 10 (and similarly commodity information reading device 40) in the embodiment. The control unit 100 of the commodity information reading device 10 (40) loads the control program P1 (P2) in the RAM 103 and executes the control program P1 (P2) to thereby realize, as functional units, a customer detecting unit 110, a wireless-tag reading unit 111, a commodity registering unit 112, and a communication control unit 113 illustrated in FIG. 5.

The customer detecting unit 110 detects that the customer approaches the commodity information reading device 10 (40). Specifically, the customer detecting unit 110 monitors an output of the human sensor 12 to thereby detect the approach of the customer.

The wireless-tag reading unit 111 performs wireless communication between the wireless-tag reading unit 111 and the RFID tags 22 to thereby read tag information transmitted by the RFID tags 22.

The wireless-tag reading unit 111 transmits a sales finishing command to the RFID tags 22 and writes, in the RFID tags 22, information indicating that the commodities H are sold. The commodity information reading device 40 particularly includes this function.

The commodity registering unit 112 registers, based on the tag information read by the wireless-tag reading unit 111, commodity codes indicating the commodities H in the commodity registration file F1.

The communication control unit 113 performs communication between the communication control unit 113 and the checkout device 30 and the store server and performs transmission and reception of data, files, and the like.

The control unit 300 of the checkout device 30 similarly loads the control program P3 in the RAM 303 and executes the control program P3 to provided various functional units for performing a payment process. However, detailed explanation of the control unit 300 is omitted.

Figure 6:
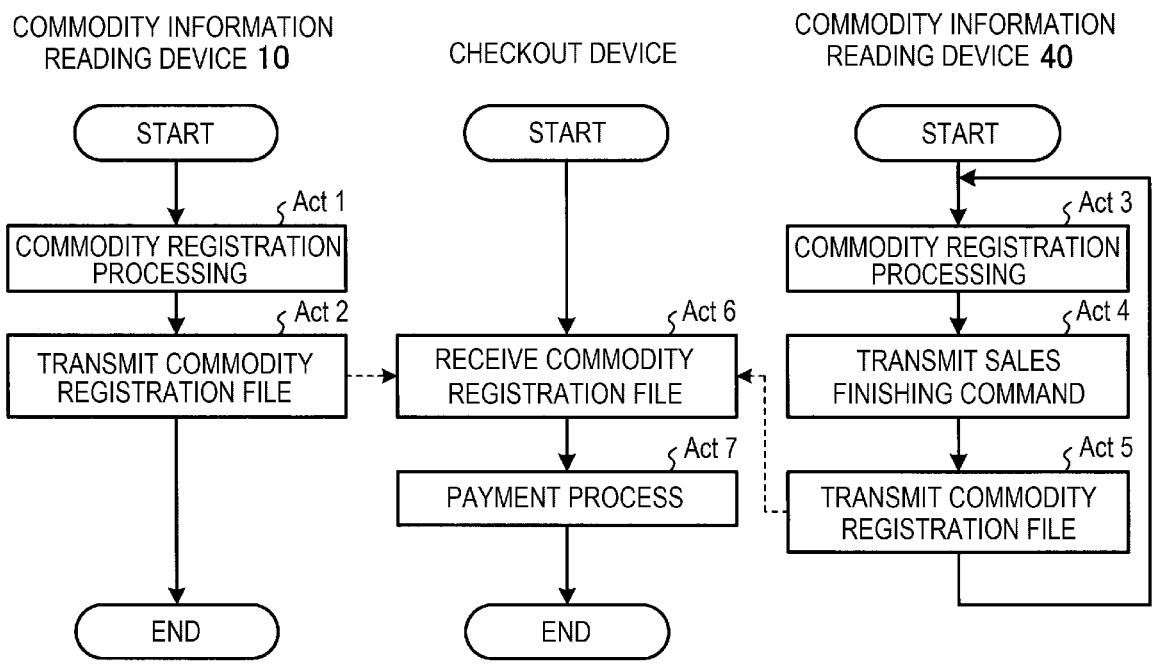
FIG. 6 is a flowchart illustrating aspects of processing performed in a commodity sales data processing system.

Explanation of a Flow of Processing Performed in a Commodity Sales Data Processing System A flow of processing performed by the commodity sales data processing apparatus 50 is explained with reference to FIG. 6. FIG. 6 is a flowchart illustrating an example of the flow of the processing performed by the commodity sales data processing apparatus 50 in the embodiment.

First, a flow of processing performed by the commodity information reading device 10 is explained. The commodity registering unit 112 registers, in the commodity registration file F1, commodity codes that the wireless tag reading unit 111 collectively reads from the RFID tags 22 (Act 1).

The communication control unit 113 transmits the commodity registration file F1 to the checkout device 30 (Act 2).

Thereafter, the commodity information reading device 10 ends the processing illustrated in FIG. 6.

In the commodity information reading device 40, if the customer bags the commodities H, the commodity registering unit 112 registers, in the commodity registration file F1, the commodity codes that the wireless-tag reading unit 111 reads from the RFID tags 22 attached to the commodities H during bagging (Act 3). The wireless-tag reading unit 111 transmits a sales finishing command to the RFID tags 22 and writes, in the RFID tags 22, information indicating that the commodities H are sold (Act 4). The communication control unit 113 transmits the commodity registration file F1 to the checkout device 30 (Act 5). The commodity information reading device 40 repeatedly executes this processing until a payment process is performed. A flow of processing in Acts 1 to 3 is explained below (see FIG. 7).

A Flow of Processing Performed by the Checkout Device 30 is explained. The checkout device 30 receives the commodity registration file F1 from the commodity information reading device 10 (Act 6).

Subsequently, the checkout device 30 performs the payment process (Act 7). Thereafter, the checkout device 30 ends the processing illustrated in FIG. 6.

Explanation of Processing Performed by the Commodity Information Reading Devices 10 and 40

Figure 7:
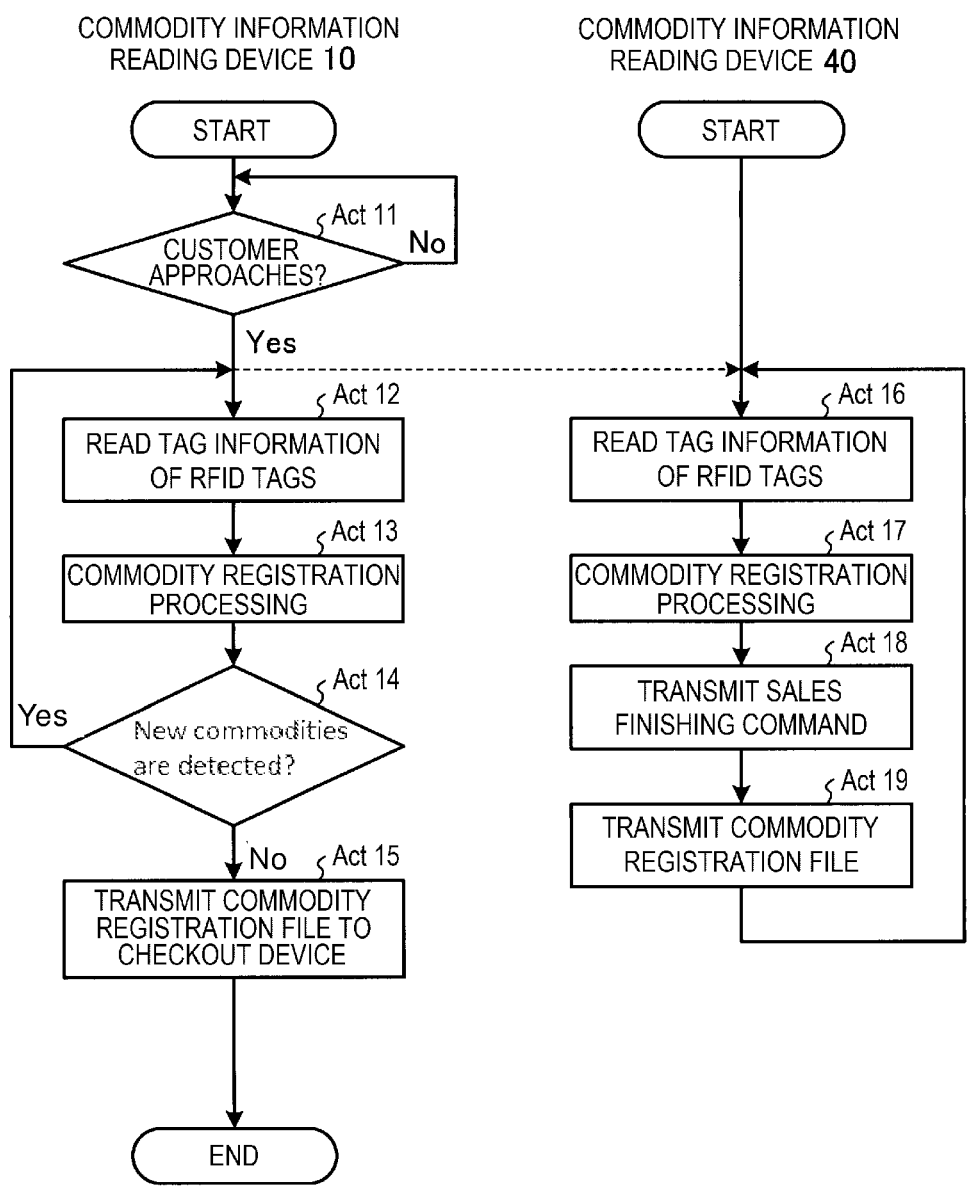
FIG. 7 is a flowchart illustrating aspects of commodity registration processing performed by a commodity information reading device.

A flow of processing performed by the commodity information reading device 10 (40) is explained with reference to FIG. 7. FIG. 7 is a flowchart illustrating an example of a flow of commodity registration processing performed by the commodity information reading device 10 (40) in the embodiment.

The customer detecting unit 110 determines whether the customer approaches the commodity information reading device 10 (Act 11). If determining that the customer approaches the commodity information reading device 10 (or alternatively approaches commodity information reading device 40 in other examples) (Yes in Act 11), the customer detecting unit 110 proceeds to Act 12. ON the other hand, if determining that the customer does not approach the commodity information reading device 10 (40) (No in Act 11), the customer detecting unit 110 repeats Act 11.

If it is determined Yes in Act 11, the wireless-tag reading unit 111 of the commodity information reading device 10 reads the tag information of the RFID tags 22 (Act 12).

Subsequently, the commodity registering unit 112 of the commodity information reading device 10 executes commodity registration processing for registering, in the commodity registration file F1, the commodity codes relating to the commodities H based on the tag information previously read in Act 12 (Act 13).

If new commodities H are not detected (No in Act 14), the communication control unit 113 of the commodity information reading device 10 transmits the commodity registration file F1 to the checkout device 30 (Act 15). If new commodities H are detected (Yes in Act 14), the communication control unit 113 of the commodity information reading device 10 returns to Act 12.

The wireless-tag reading unit 111 of the commodity information reading device 40 reads the tag information of the RFID tags 22 (Act 16). If the customer is bagging, on the sacker table 40a, the commodities H placed on the commodity placing table 10a, the wireless-tag reading unit 111 of the commodity information reading device 40 reads the commodity codes of the commodities H being bagged.

Subsequently, the commodity registering unit 112 of the commodity information reading device 40 executes commodity registration processing for registering, in the commodity registration file F1, the commodity codes relating to the commodities H detected based on the tag information read in Act 16 (Act 17).

Subsequently, the wireless-tag reading unit 111 of the commodity-information reading device 40 transmits a sales finishing command to the RFID tags 22 subjected to the commodity registration processing and writes, in the RFID tags 22, information indicating that the commodities H attached with the RFID tags 22 are sold (Act 18). The wireless-tag reading unit 111 transmits, to those RFID tags 22 that transmitted the registered commodity codes, information indicating that the commodities H are sold.

Subsequently, the communication control unit 113 of the commodity information reading device 40 transmits the commodity registration file F1 to the checkout device 30 (Act 19). The commodity information reading device 40 repeatedly executes this processing until a payment process is performed.

In this way, according to this embodiment, processing for writing information indicating that the commodities H have been sold is performed during the reading of the individual RFID tags 22 during the bagging after the collective reading of the tag information. Consequently, it is possible to write, in the RFID tags 22, information indicating that the commodities H are sold while reducing a time for collectively reading the RFID tags 22 as compared with the past. During the bagging, since a time for individually bagging the commodities H in a bag is relatively long, even if the information indicating that the commodities H are sold is written in the RFID tags 22 during the bagging, a total processing time is not affected.

In reading the RFID tags 22 during the bagging, the customer holds the commodities H and places the commodities H in the bag. Accordingly, even if the commodities H overlap one another while on the commodity placing table 10a, the commodities H are typically individually handled (and thus separated from each other) during portions of the bagging process. Accordingly, it is possible to solve the problem in that information indicating that the commodities H are sold cannot be written in the RFID tags 22 when products are overlapped with one another.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A commodity sales data processing apparatus, comprising:
    a registration unit configured to register articles to be purchased in a sales transaction;
    a first region in which an article to be purchased is initially placed;
    a first antenna positioned to read information from a wireless tag on the article when the article is placed in the first region;
    a first tag reader connected to the first antenna and configured to send article information read from the wireless tag to the registration unit to register the article in the sales transaction;
    a second region in which the article to be purchased is to be placed after being in the first region;
    a second antenna positioned to read information from the wireless tag on the article when the article is placed in the second region; and
    a second tag reader connected to second antenna and configured to send article information read from the wireless tag to the registration unit to register the article in the sale transaction if not already registered and transmit a sale finished command to the wireless tag when the article has already been registered by the first tag reader.

2. The commodity sales data processing apparatus according to claim 1, wherein the registration unit is configured to accept customer payments for settling the sales transaction.

3. The commodity sales data processing apparatus according to claim 2, wherein the second tag reader is configured to transmit the sales finished command to the wireless tag before the registration unit accepts the customer payments for settling the sales transaction.

4. The commodity sales data processing apparatus according to claim 1, wherein the first tag reader is configured to read a plurality of wireless tags at one time.

5. The commodity sales data processing apparatus according to claim 1, wherein the first and second regions are different portions of a checkout counter.

6. The commodity sales data processing apparatus according to claim 1, wherein the second region includes bagging hooks therein.

7. The commodity sales data processing apparatus according to claim 1, wherein the first antenna comprises a vertically oriented antenna portion and a horizontally oriented antenna portion.

8. The commodity sales data processing apparatus according to claim 1, wherein the second antenna comprises a vertically oriented antenna portion and a horizontally oriented antenna portion.

9. The commodity sales data processing apparatus according to claim 1, further comprising:
    a sensor configured to detect the presence of a human adjacent to the first region, wherein
    the first tag reader is configured to begin reading information from wireless tags in the first region when the sensor detects the presence of the human adjacent to the first region.

10. The commodity sales data processing apparatus according to claim 9 wherein
    the registration unit is configured to accept customer payments for settling the sales transaction,
    the first tag reader is configured to read a plurality of wireless tags at one time,
    the second region includes bagging hooks therein,
    the first antenna comprises a vertically oriented antenna portion and a horizontally oriented antenna portion, and
    the second antenna comprises a vertically oriented antenna portion and a horizontally oriented antenna portion.

11. The commodity sales data processing apparatus according to claim 1, wherein
    the registration unit is configured to accept customer payments for settling the sales transaction,
    the first tag reader is configured to read a plurality of wireless tags at one time,
    the second region includes bagging hooks therein,
    the first antenna comprises a vertically oriented antenna portion and a horizontally oriented antenna portion, the second antenna comprises a vertically oriented antenna portion and a horizontally oriented antenna portion, and the first and second regions are different portions of a checkout counter.

12. The commodity sales data processing apparatus according to claim 1, wherein sale finished commands are transmitted only by the second tag reader, and the first tag reader is not configured to transmit a sales finished command upon reading wireless tag information via the first antenna.

13. A commodity sales data processing method, comprising:

reading, with a first tag reader, wireless tag information via a first antenna positioned to read information from a wireless tag on an article placed in a first region in which an article to be purchased in a sales transaction is placed;

sending article information read from the wireless tag by the first tag reader to a registration unit to register the article in the sales transaction;

reading, with a second tag reader, wireless tag information via a second antenna positioned to read information from the wireless tag on the article placed in a second region in which the article to be purchased is to be placed after being in the first region;

sending article information read from the wireless tag by the second tag reader to the registration unit to register the article in the sales transaction if not already registered; and transmitting, with the second tag reader, a sale finished command to the wireless tag via the second antenna when the article has already been registered by the first tag reader.

14. The commodity sales data processing method according to claim 13, wherein the registration unit is configured to accept customer payments for settling the sales transaction.

15. The commodity sales data processing method according to claim 14, wherein the second tag reader transmits the sales finished command to the wireless tag before the registration unit accepts the customer payments for settling the sales transaction.

16. The commodity sales data processing method according to claim 13, wherein the first tag reader is configured to read a plurality of wireless tags at one time.

17. The commodity sales data processing method according to claim 13, wherein the first and second regions are different portions of a checkout counter.

18. The commodity sales data processing method according to claim 13, wherein the second antenna comprises a vertically oriented antenna portion and a horizontally oriented antenna portion.

19. The commodity sales data processing method according to claim 13, further comprising:

detecting the presence of a human adjacent to the first region, wherein the first tag reader is configured to begin reading information from wireless tags in the first region when the sensor detects the presence of the human adjacent to the first region.

20. The commodity sales data processing method according to claim 13, wherein sale finished commands are transmitted only by the second tag reader, and the first tag reader is not configured to transmit a sales finished command upon reading wireless tag information via the first antenna.

* * * * *